United States Patent [19]

Gottesman et al.

[11] Patent Number: 4,878,048

[45] Date of Patent: Oct. 31, 1989

[54] CHANNEL REDUNDANCY IN A DIGITAL LOOP CARRIER SYSTEM

[75] Inventors: Jeffrey L. Gottesman, Morris Plains, N.J.; Mark A. Dempsky, Glendale Heights, Ill.; Donald E. Koch, Aurora, Ill.; Dev R. Rattan, Chicago, Ill.

[73] Assignee: Rockwell International Corporation, El Segundo, Calif.

[21] Appl. No.: 230,641

[22] Filed: Aug. 10, 1988

[51] Int. Cl.[4] .............................................. H04K 1/00
[52] U.S. Cl. ............................. 340/825.010; 370/13; 370/14; 371/8.2; 371/20.1; 379/27
[58] Field of Search ................. 340/825.01; 370/13, 370/14, 16, 17; 379/27; 371/8, 22, 11

[56] References Cited

U.S. PATENT DOCUMENTS

| 4,270,030 | 5/1981 | Brolin et al. | 370/13 |
| 4,424,421 | 1/1984 | Townsend et al. | 370/14 |
| 4,653,043 | 3/1987 | Brady et al. | 370/13 |

FOREIGN PATENT DOCUMENTS 105689  6/1983  Japan ................. 340/825.01

Primary Examiner—Donald J. Yusko
Assistant Examiner—Brian Palladino
Attorney, Agent, or Firm—C. B. Patti; V. L. Sewell; H. F. Hamann

[57] ABSTRACT

A channel redundancy system for use with a central office connected to a remote location. A central office terminal at the central office has a plurality of channel units including at least one spare channel unit. A remote terminal at the remote location also has a plurality of channel units including at least one spare channel unit. The channel units in the remote terminal are correspondingly associated with the channel units in the central office termimal. From a repair service bureau located remote from both the central office and the remote location in a defective channel unit can be identified and replaced by the spare channel unit.

18 Claims, 3 Drawing Sheets

1

CHANNEL REDUNDANCY IN A DIGITAL LOOP CARRIER SYSTEM

BACKGROUND OF THE INVENTION

The present invention relates to an apparatus and method for use in channelizing telephone transmission equipment, and in particular, to providing channel redundancy to replace defective equipment remotely thereby providing immediate restoral of service and delay in repair dispatch.

Subscriber loop pair gain systems are well known in the prior art and the testing of such systems is disclosed for example in U.S. Pat. No. 4,270,030 issued to Brolin et al. This patent discloses a testing system for telephone subscribing loops which are in part derived by multiplex facilities and systems known as pair gain systems. In this testing arrangement, the local drop wires from a remote terminal of the pair gain system to the subscriber are separated from the carrier system itself and are tested by connecting them to a separate metallic pair extending from a central office to the remote terminal location. Simultaneously, the carrier derived portion of the subscriber loop is connected to automatic testing apparatus which sequences through a plurality of automatic tests for not only transmission characteristics of the carrier derived channel, but also for testing the ability of the derived channel to transmit information such as ringing, coin control, on/off hook states and party identification information. The remote terminal of the pair gain channel is selectively terminated by a reflective or absorbitive termination to assist in this testing procedure. The testing system is designed so as to make carrier derived channels appear to the central office testing personnel as if they were identical to metallic loops.

Rockwell International provides products to implement digital loop carrier systems which include appropriate software for affecting such tests as described above. In a typical digital loop carrier system, a channel bank at a remote terminal or at the central office will contain a plurality of channel units. In the present technology, these channel units have no redundancy or backup units for automatic replacement. In channelizing equipment associated with such telephone equipment, individual channel units or circuit modules associated with specific channels, make up the majority of equipment prone to failure. Failures of this type must be repaired as soon as possible in order to restore telephone service to a customer, usually within a matter of hours. This equipment may be located in areas that are not easily accessible on a 24-hour basis, and dispatching of repair personnel during "non business" hours may be extremely costly. Thus, there is a need in the prior art to provide a method and apparatus to replace the defective equipment remotely in order to provide immediate restoral of the schedules permit.

The present invention provides a solution to this drawback in the prior art.

SUMMARY OF THE INVENTION

It is an object of the present invention to provide a procedure for the remote replacement of channel units which is easy to activate using familiar procedures, and which does not require any specialized equipment in existing telephone company offices.

The invention is a procedure for temporarily substituting a spare individual channel in channelizing transmission equipment for one that has failed. Immediate application of the invention is found in digital loop carrier equipment as commonly used in the "loop" portion of the telecommunications network, but it is not limited to these applications. In a typical digital loop carrier application, channel banks are located in a telephone company's central office and at some remote site which may be in a structure, in a cabinet in the outside plant environment, or on a customer's premises, and referred to as a remote terminal. The invention is not limited to digital loop carrier applications, but can find usefulness in trunking environments in other types of situations where multiple channel banks are connected together via analog or digital carrier facilities.

The equipment substitution can take place at any time in order to immediately restore a service interruption that has occurred, without the necessity for a dispatch by repair personnel. Special circuitry, relays, and software are present in all channel units and system equipment, such as channel banks, which allow customer service to be bypassed onto a dedicated "spare" unit in the event of a failure in the channel unit that was currently carrying the service. The procedure used to activate the substitution does not require the presence of a person at the location of any of the channelizing equipment.

Using existing manual and/or software controlled automated "loop testing equipment" that is generally available in a telephone company environment, the invention can be activated and deactivated using existing, generally accepted procedures without the need for any additional equipment. Once activated, the "spare" channel units are placed into service at both ends of the carrier facility.

At a later time when repair personnel replace the "failed" circuit modules, the invention is provisioned for performing manual "go/no go" tests on the new channel units before deactivation of the invention and restoral of service onto the new channel unit. These "go/no go" tests do not require any special test equipment and are activated via simple procedures from telephones equipped with dual tone multifrequency dialing.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figures 1, 2:
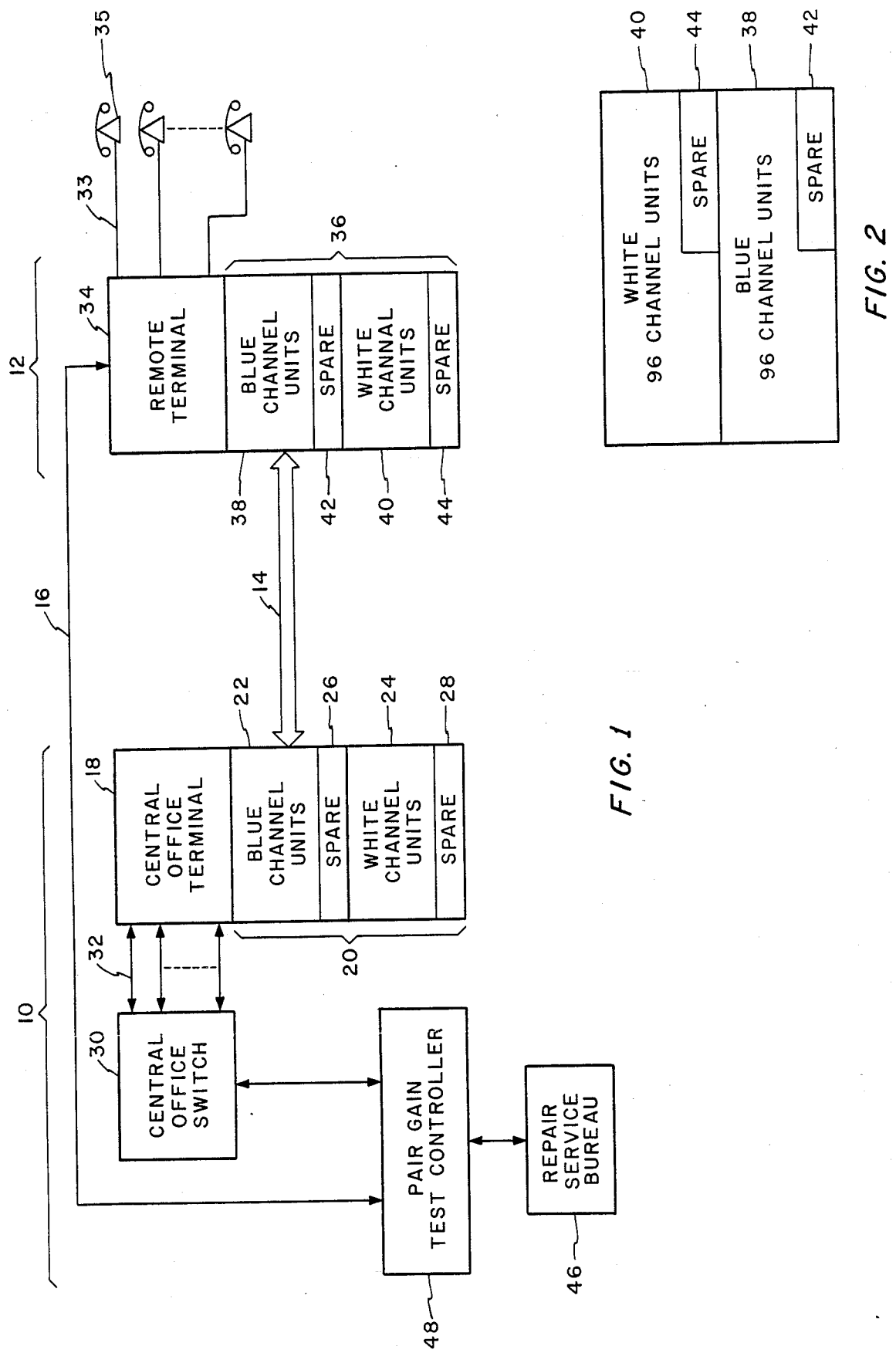
FIG. 1 is a general block diagram depicting a digital carrier loop system incorporating the present invention.
FIG. 2 is a schematic representation of two systems in a channel bank at a remote terminal location.

The present invention has general applicability but is most advantageously utilized in a digital loop carrier system of the type shown in FIG. 1. The FIG. 1 general block diagram also depicts the incorporation of a pair gain test system as is known in the prior art with the digital carrier loop system.

As shown in FIG. 1, a central office location 10 is connected to a remote location 12 by transmission line system 14 and a bypass pair line 16. The transmission line system 14 is to be understood as having digital multipliers and digital lines between the central office terminal 18 and the remote terminal 34. The bypass pair line 16 is utilized for the pair gain test system. The central office 10 has a central office terminal 18 also referred to as channel banks. The channel banks 18 are composed of a plurality of channel units in a blue channel system 22 and a white channel system 24. Each of the channel systems 22 and 24 contain at least one spare channel 26 and 28 respectively. The references to "white" and "blue" channel systems are terminology adapted by Rockwell International for its equipment.

The central office 10 also has a central office switch 30 which is connected by leads 32 to the central office terminal 18. Central office switches which are known in the prior art may be utilized for the central office switch 30 shown in FIG. 1. The central office terminal 18 provides derived subscriber channels over outgoing digital lines 14 using well known analog or digital multiplexing techniques. A corresponding remote terminal 34 of the system separates the signals on the digital line 14 into a plurality of voice frequency analog signals on local drop wires 33 for delivery to a plurality of subscriber stations 35.

The remote terminal 34 has a blue channel system 38 and a white channel system 40 each having a plurality of channel units and at least one spare channel 42 and 44, respectively.

The central office 10 also includes a repair service bureau 46 for testing purposes. The repair service bureau 46 may be physically located at the central office 10, but often is located at a location remote from the central office 10. The repair service bureau 46 normally includes either manual local test facilities for manually testing loops or may include automatic testing equipment for automatically testing the loops. The principal function of the repair service bureau 46 is a testing of loops when a report of equipment failure is received from a customer at a subscriber station 35. The repair service bureau 46 is connected to a pair gain test controller 48 as is well known in the prior art. The pair gain test controller 48 is connected to the bypass pair line 16 and to the central office switch 30. As is known in the prior art a repair service bureau 46 will use the pair gain test controller 48 to perform a test on the system, thereby identifying for example, a defective channel unit in the remote terminal 34 for a particular associated subscriber station 35. The pair gain test controller 48 determines that a failure exists, but cannot determine if the failure occurs at the central office 10 or at the remote location 12.

As shown in FIG. 2, each of the channel banks 18 and 34 are divided into a white channel system 40 and a blue channel system 38 with reference to the remote terminal 34. The central office terminal 18 has a similar structure of channel banks. Typically, each of these channel systems 38 and 40 will contain 48 channel units. One of these 48 channel units in each of the systems 38 and 40 have a spare channel unit 42 and 44 respectively. It is to be appreciated that the spare channel unit is identical to the other channel units contained in the channel unit banks. The spare channel unit is retained only for redundancy purposes and is not any type of specialized equipment. The spare channel unit may have one or two channels on it. If it contains two channels, only one is a spare; the other can be used for normal service. For the purpose of this discussion the spare channel is referred to as a spare channel unit.

Figure 3:
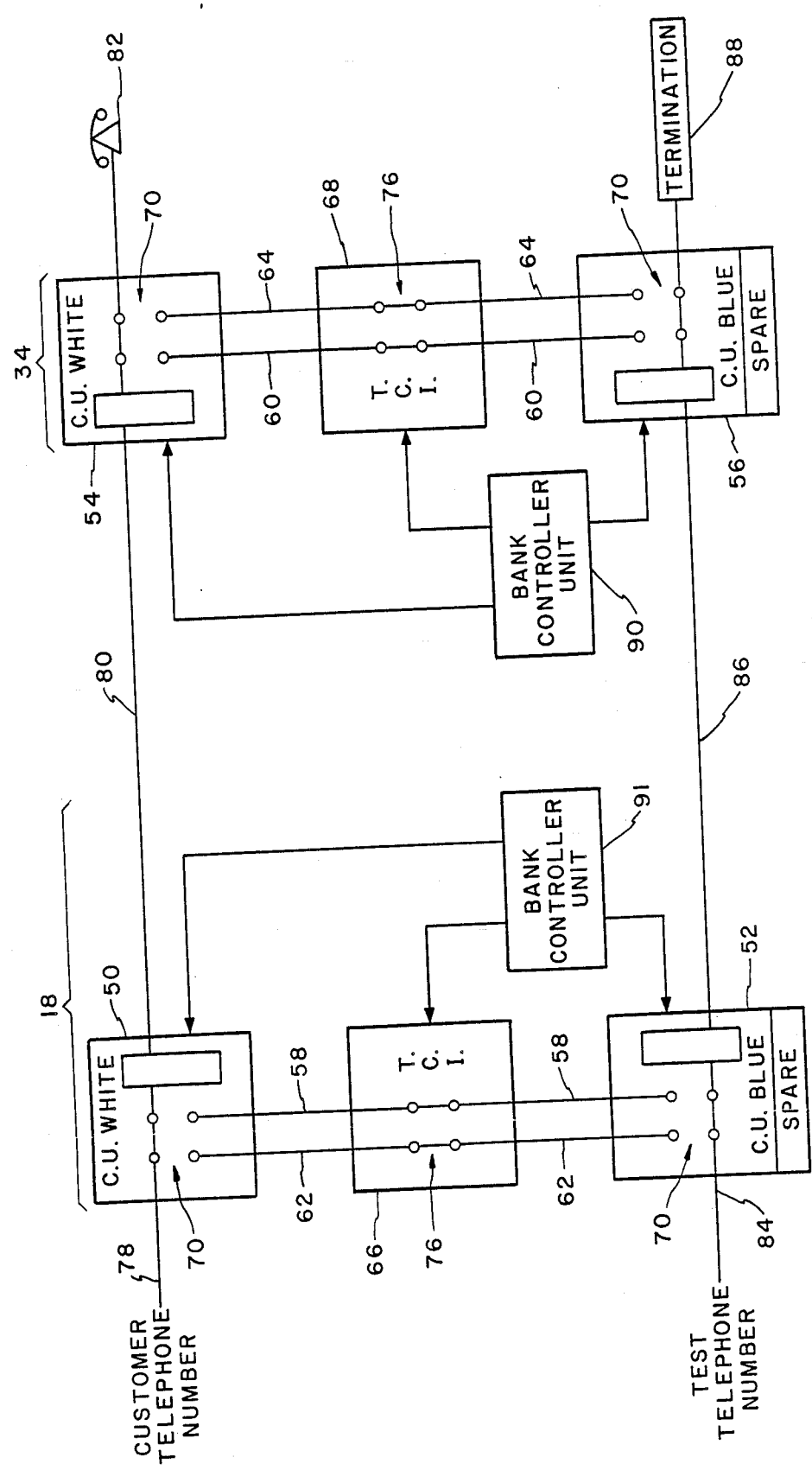
FIG. 3 is a schematic diagram of channel banks at a central office and a remote location for normal operation.

FIG. 3 is a more detailed schematic diagram depicting the central office terminal 18 and the remote terminal 34 operating under normal conditions. Shown in this schematic for clarity purposes is only one channel unit in the white channel system and one channel unit in the blue channel system, specifically, channel units 50 and 52 at the central office terminal 18, and channel units 54 and 56 at the remote terminal 34. In both the central office terminal 18 and the remote terminal 34, a first bus 58 and 60, respectively, and a second bus 62 and 64, respectively, are provided on the back plane of the terminals 18 and 34. In addition, each terminal 18 and 34 contains a test controller interface 66 and 68, respectively. Each channel unit is provided with a relay 70 and the test controller interfaces 66 and 68 are also provided with cross interconnecting relays 76. The relays 70 and 76 are utilized for connecting the channel units and the test controller interfaces to the first and second buses.

As can be seen in FIG. 3, a typical channel unit 50 in the white channel system of the central office terminal 18 is connected to receive a customer telephone number on line 78 via relay 70. The transmission line 80 connects the channel unit 50 to a channel unit 54 in the white channel system in the remote terminal 34. In turn, the channel unit 54 is connected through its relay 70 to the subscriber station 82 associated with the channel unit 54. The channel unit 52 is the designated "spare" channel unit in the blue channel system of the central office terminal 18 and is connected to receive a test telephone number on line 84. Transmission line 86 connects the channel unit 52 to the channel unit 56 in the blue channel system of the remote terminal 34. The channel unit 56 is designated the "spare" channel unit in the blue channel system of the remote terminal 34 and may be appropriately terminated as schematically shown as box 88 in FIG. 3.

A bank controller unit 90 implemented in firmware controls the operation of the channel units 54 and 56 in the remote terminal 34, as well as, the test controller interface 68. The bank controller unit 90 receives commands from the bank controller unit 91 which in turn receives commands from the central office 10 over an internal data link between the central office terminal and the remote terminal.

Figure 4:
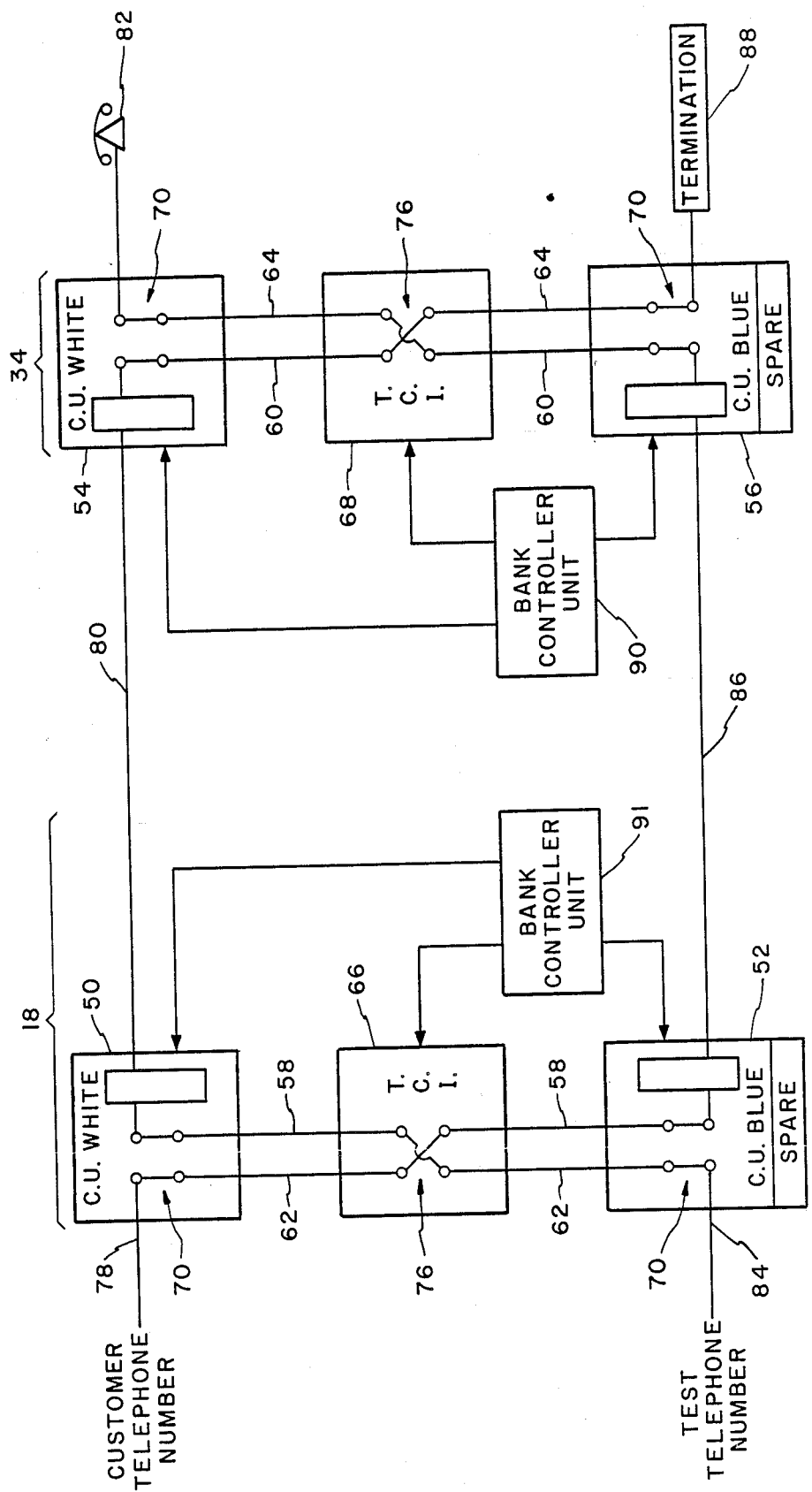
FIG. 4 is a schematic diagram of channel banks at a central office and a remote location in which a defective channel unit has been replaced with a spare channel unit.

FIG. 4 shows the results of the identification of a defective channel unit at the remote terminal 34. For the present example, it will be assumed that the channel unit 54 at the remote terminal 34 has become defective, therefore, eliminating service to its associated subscriber station 82. It is to be understood that the defective channel unit could be at the central office terminal 18 rather than at the remote terminal 34. After the above described pair gain test has been performed by the repair service bureau and a defective channel has been identified, an appropriate signal is sent to the bank controller units 90 and 91 from the central office 10 as described in the prior art. In response to this signal, relay 70 in the channel unit 54 is activated which disconnects the channel unit 54 from the subscriber station 82 and also connects the channel unit 54 to the first bus 60 and connects the subscriber station 82 to the second bus 64. The activation can be accomplished from a Repair Service Bureau or via direct communication with the Bank Controller Units through a computer terminal. Similarly, the relay 70 in the spare channel unit 56 disconnects the spare channel unit 56 from its termination 88 and connects the channel unit 56 to the first bus 60 and connects the spare termination 88 to the second bus 64. Simultaneously, the bank controller unit 90 causes the test controller interface 68 to activate the cross interconnection relay 76. This relay 76 as shown in FIG. 4 causes the buses 60 and 64 to be interconnected, that is, the first bus from the channel unit 54 becomes the second bus at the channel unit 56 and the second bus at the channel unit 54 becomes the first bus at the channel unit 56.

Similarly, the relays 70 and the channel units 50 and 52 at the central office terminal 18 are activated, as well as, the cross interconnection relay 76 in the test controller interface 66. This results in a similar connection as that at the remote terminal 34. By observing FIG. 4, it can be seen that starting with the subscriber station 82 the connection path now goes through the second bus 64 until the path reaches the test controller interface 68, where it then follows first bus 60 to the spare channel unit 56. It is then connected along transmission line 86 to the spare channel unit 52 at the central office terminal 18 where it now proceeds along the first bus 58 until it reaches the test controller interface 66 where it has been switched onto the second bus 62 which proceeds then to be connected to the customer telephone number line 78. A similar path now connects the test telephone number line 84 to the spare termination 88 as can be seen in FIG. 4. Thus, the defective channel unit 54 has been effectively and automatically replaced from the central office terminal 18. While this now has the effect that no further pair gain test can be performed upon the system, it is generally known that it is very rare that a second channel unit will fail before the defective unit can be replaced during normal working hours.

Furthermore, once the defective channel unit has been replaced with a new channel unit, a go/no go test can be performed upon the system to ensure that the new channel unit operates properly. The repair personnel at the remote terminal or central office terminal then resets the relays 70 and 76 in the channel units and the test controller interface to return the system to operation as shown in FIG. 3. This restorial can be done from the remote terminal, from the central office terminal or from a Repair Service Bureau.

The go/no go test is activated via any telephone which has the ability to send DTMF signaling. The purpose of this test is to verify that the suspected bad channel unit is now working since a new channel unit has been installed in the channel unit position. This is done by dialing the test telephone number. The central office switch equipment will terminate this call on the suspected bad central office terminal channel unit, 50, via pair 78, relay 70, test bus 62, relay 76 and test bus 58 at the central office terminal. The call is transmitted to the suspected bad remote terminal channel unit, 54, via the digital facilities, 80, and then routed over test trunk 60, relay 76, and test trunk 64. Relay 70 in the suspected bad RT channel unit connects the call to termination 88 which detects the ringing signal. Termination 88 presents an off-hook state. If ringing is successfully tripped, it indicates that signaling information can be transmitted in both directions on the suspected bad channel unit pair. In order to verify transmission in both directions, any DTMF key in the middle row of keys (2,5,8, or 0) should be depressed. The termination, 88, will detect this DTMF tone and respond by sending back a 1 KHz tone through the same voice frequency path all the way back to the telephone which initiated the test call. If all of the above is successful, then the pair of suspected bad channel units are operating and the bad channel unit has been successfully exchanged for a good unit.

An alternative test can be performed from the remote terminal via a System Access Unit (SAU) module which is unique to the Rockwell system. When redundancy is activated, the SAU will display the number of the bad channel unit. In addition, it will provide a monitor access to the tip and ring wires of the suspected bad channel unit. During channel redundancy the SAU is locked in this mode, thus any testing of the suspected bad channel unit can be done through the SAU. Typically, a suspect channel unit at the remote terminal would be replaced, and a call would be attempted over the new channel unit via the SAU access. If the call can be placed successfully, then the bad channel unit has been successfully exchanged for a good unit.

When the suspected bad channel unit is replaced by a known good one, the system will still remain in the channel redundancy mode. The two methods of testing above can be performed on either the original suspected bad channel units or the units that have been swapped into the system.

A more detailed description of the method of the present invention as implemented in Rockwell International's telephone system will now be set forth.

(1) A Pair Gain Test Controller (PGTC) test is set up on a Channel Unit (CU). The Bank Controller Units (BCUs) record the slot of the CU being tested. The message flow used is the normal PGTC message flow (2) The BCUs send a poll data (GPOLLR) command to the Test Controller Interface cards (TCIs). In the TCI's response is the state of a redundancy selection switch. The redundancy selection switch is provided as an option to disable this feature and is not shown in the drawings.

(3) The BCUs check if the redundancy mode is selected. If the redundancy mode is not selected the BCUs exit the redundancy waiting routine. If the redundancy mode is selected the BCUs begin a one minute timeout. During this timeout the following could happen.

(A) If a PGTC test were to be initiated on a CU which was not the spare CU, the BCUs would send the TCI channel seized (TCSEZ) command to the TCIs with the test bus busy bit (bit 1) set. This will cause the test controller interface in the central office terminal (TCI/C) to send the SEZBY signal to the PGTC which in turn will cause the PGTC test to be aborted. The BCUs will not record the slot of this CU nor will the BCUs reset the timeout.

(B) A PGTC test could be initiated on the same channel unit that was previously tested. The BCU will allow a PGTC test to be performed once again, but at the completion of the test, the one minute timeout would be reset. The BCU now once again waits for an action (A,B,C, or D) to occur.

(C) The timeout could expire. The BCUs would exit the redundancy wait routine.

(D) A PGTC test could be initiated on the spare CU. When the BCUs receive the interrupt data (DINTD) command, the BCUs note that the message is from the redundant CU and enter the redundancy mode.

(4) The timeout is needed to prevent a second CU from being tested while the redundant CU is being selected for a PGTC test. If this happened, an unexpected CU would be switched onto the spare channel.

(5) The BCUs send the test byte write (CUTESTW) command with the Test Mode bit set (bit 7) to the customer's CUs. This causes the customer's CUs and drops to be connected to the internal test busses.

(6) The BCUs send the CUTESTW command with the Test Mode bit set to the spare CUs. This causes the spare CUs and drops to be placed on the internal test busses. After the spare Central Office (CO) CU is switched onto the internal test busses, the PGTC test voltage will be switched from the spare CO CU to the customer's CO CU. This will cause both CUs at both ends to change the status of their test bits (the bad CUs' bits will clear and the spare CUs' bits will set). This can be used as feedback to the BCUs to indicate that the TICs have made the switch.

(7) The BCUs send the redundancy enable (TCUREN) command to the TCIs. This informs the TCIs that a redundancy switch is active.

(8) The TCIs check the status of an associated pin jack. If a pin plug is in its pin jack, it will not send the redundancy disconnect (TCURDS) message until the pin plug is removed and reinserted.

(9) The TCIs set the M-Field to TSTALM. Since both ends are in CU redundany, the TICs will suppress the TSTALM. If one end does not receive TSTALM within a given time period, that TCI will send redundancy error (TRURER) to the BCU. This informs the BCS that the other end has not entered the redundancy mode.

(10) The BCUs send the System Access Units (SAU) the redundancy command (SCURC). This causes the SAUs to bridge their bantam jacks onto the internal test buses which provides test access to the bad CU. It also causes the SAUs to display the number of the CU which has been switched onto the spare CU.

(11) The BCUs send the TCSEZ with the test bus busy bit set to the TCIs.

(12) The TCI/C sends a SEZBY to the PGTC. This sends back a busy signal to the person setting up CU redundancy.

(13) The TCIs monitor their pin jacks. If a pin plug is inserted into one of the TCI's pin jack, that TCI will send the TCURDS message. This message informs the BCUs to remove the CU redundancy set up. The other TCI will detect the M-Field return to idle. This TCI will send the TCURER message to the BCU. This will have this end remove the CU redundancy setup.

If the CU which is in the redundancy is replaced, the new CU must be instructed to connect itself to the internal test bus.

For an integrated system where only the remote end is a 3192 system, a second switch has been placed on the TCI/R. This switch would have the test controller interface in the remote terminal (TCI/R) ignore the fact that the central office end did not enter the redundancy mode. The only way the remote end could be removed from the redundancy mode is to insert a pin jack in the TCI/R. The switch would have to be changed to invoke the switch to the central office end.

If the BCU cannot setup CU redundancy, the BUCs will not send TCRCV. The PFTC will timeout and tear down the test. The lack of a busy signal to the person setting up CU redundancy will indicate that CU redundancy was not setup.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A channel redundancy system for use with a central office connected to a remote location comprising:
   a central office terminal at the central office having a plurality of channel units including at least one spare channel unit;
   a remote terminal at the remote location having a plurality of channel units including at least one spare channel unit, said channel units in said remote terminal associated correspondingly with said channel units in said central office terminal;
   means for providing transmission lines for connecting said channel units of said central office terminal to said channel units of said remote terminal;
   means for identifying a defective one of said channel units in one of said remote terminal and in said central office terminal; and
   means for automatically exchanging said identified defective channel unit with said spare channel unit in said one of said remote terminal and said central office terminal.

2. The channel redundancy system according to claim 1, wherein said means for automatically exchanging also exchanges in the other of said remote terminal and said central office terminal a channel unit corresponding to said defective channel unit in said one of said remote terminal and said central office terminal with said spare channel unit in said other of said remote terminal and said central office terminal.

3. The channel redundancy system according to claim 2, wherein said plurality of channel units in each of said central office terminal and said remote terminal are divided into at least first and second channel systems, each of said channel systems having a spare channel unit.

4. The channel redundancy system according to claim 3, wherein a defective channel unit in one of said channel systems is exchanged with a spare channel unit in the other of said channel systems.

5. The channel redundancy system according to claim 4, wherein said means for automatically exchanging comprises in each of said central office terminal and said remote terminal;
   each of said channel units having means for connecting said channel unit to an associated telephone line and to first and second busses in said terminal, and said spare channel units connected to an associated termination,
   test controller interface having means for cross interconnecting said first and second busses between said first and second channel banks,
   means for controlling said menas for connecting and said means for cross interconnecting; and when a selected one of said channel units in one of said first and second channel systems is identified as defective, said means for controlling disconnecting said selected channel unit from its associated telephone line and connecting said selected channel unit and its associated telephone line to said first and second busses, respectively, said means for controlling disconnecting said spare channel unit in the other of said first and second channel systems from its associated termination and connecting said spare channel unit and its associated termination to said first and second busses, respectively, and cross-interconnecting said first and second busses between said first and second channel systems.

6. The channel redundancy system for use with a central office connected to a remote location according to claim 1, wherein said means for identifying is a pair gain test controller.

7. The channel redundancy system for use in a terminal comprising:
first and second channel systems each having a plurality of channel units and at least first and second busses, at least a predetermined one of said channel units being a spare channel unit in each of said first and second channel systems;
means for providing a transmission line connected to each of said channel units;
each of said channel units having means for connecting said channel unit to an associated telephone line and to said first and second busses, said spare channel units being connected to an associated termination;
test controller interface having means for cross interconnecting said first and second busses between first and second channel banks;
means for controlling said means for connecting in each of said channel units and said means for cross-interconnecting in said test controller interface; and
when a selected one of said channel units in one of said first and second channel systems is identified as defective, said means for controlling disconnecting said selected channel unit from its associated telephone line and connecting said selected channel unit and its associated telephone line to said first and second busses, respectively, said means for controlling disconnecting said spare channel unit in the other of said first and second channel systems from its associated termination and connecting said spare channel unit and its associated termination to said first and second busses, respectively, and cross-interconnecting said first and second busses between said first and second channel banks.

8. The channel redundancy system described in claim 7 wherein the system further comprises a central office with a central office terminal and a remote terminal connected thereto by said transmission lines; each of said central office terminal and said remote terminal having said first and second channel systems, said test controller interface, and said means for controlling; a means for identifying a defective channel unit in one of said remote terminal and said central office terminal; and means responsive thereto for causing said defective channel unit and its associated channel unit in said other of said remote terminal and said central office terminal to be replaced with said spare channel units in said remote terminal and said central office terminal.

9. The channel redundancy system described in claim 7, wherein said means for identifying is a pair gain test controller.

10. The channel redundancy system described in claim 7, wherein said means for causing is a bank controller unit in said central office terminal and a bank controller unit in said remote terminal.

11. A method for providing channel redundancy in a system having a central office connected by transmission lines to a remote location, comprising the steps of:
(A) providing at least first and second channel systems having a pluralty of channel units connected to telephone lines with at least one spare unit in each of a central office terminal at the central office and a remote terminal at the remote location;
(B) testing for a defective channel unit in said remote terminal and in said the central office terminal;
(C) identifying said defective channel unit in one of said channel systems in one of said remote terminal and said central office terminal;
(D) remotely disconnecting the defective channel unit in one of said channel systems in said one of said remote terminal and said central office terminal from a telephone line and connecting said telephone line to said spare channel unit in the other of said channel systems in said one of said remote terminal and said central office terminal; and
(E) disconnecting a predetermined channel unit in one of said channel systems in the other of said remote terminal and said central office terminal, associated with said defective channel unit from a telephone line and connecting said telephone line to said spare channel unit in the other of said channel systems in said other of said remote terminal and said central office terminal, said spare channel unit in said central office terminal being connected to said spare channel unit in said remote terminal.

12. The method described in claim 11 wherein said method further comprises the steps of:
(F) manually replacing said defective channel unit with a new channel unit, and
(G) resetting said system to connect said new channel unit to said telephone line and to disconnect said telephone line from said spare channel unit, and also to reconnect said associated channel unit and disconnect said spare channel unit.

13. The method described in claim 11, wherein said method further comprises in step (D):
connecting said defective channel unit to a first bus and connecting said telephone line to a second bus;
disconnecting said spare channel unit from an associated termination;
connecting said spare channel unit to said first bus and connecting said associated termination to said second bus; and
cross-interconnecting said first and second busses between said first and second channel systems.

14. The method described in claim 11, wherein said method further comprises in step (E):
connecting said associated channel unit to a first bus and connecting said telephone line to a second bus;
disconnecting said spare channel unit from an associated termination;
connecting said spare channel unit to said first bus and connecting said associated termination to said second bus; and
cross-interconnecting said first and second busses between said first and second channel systems.

15. The channel redundancy system according to claim 1, wherein said plurality of channel units in each of said central office terminal and said remote terminal are different types of electronic units.

16. The channel redundancy system according to claim 15, wherein means for automatically exchanging replaces a defective channel unit with a spare channel unit of the same type of electronic unit.

17. The channel redundancy system according to claim 1, wherein said means for automatically exchanging and said means for identifying are controlled from a Repair Service Bureau.

18. The channel redundancy system according to claim 1, wherein said means for exchanging and said means for identifying are controlled from a computer terminal which communicates with bank controller units connected to said central office terminal and said remote terminal, respectively.

* * * * *